United States Patent
Murakami et al.

(10) Patent No.: US 6,572,164 B2
(45) Date of Patent: Jun. 3, 2003

(54) STRUCTURE FOR ABSORBING POSITIONAL DISPLACEMENT OF AN ARTICLE CLAMPED BY ROBOT ARMS

(75) Inventors: Takao Murakami, Shizuoka (JP); Yoshitsugu Sawada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/884,995

(22) Filed: Jun. 21, 2001

(65) Prior Publication Data

US 2002/0000730 A1 Jan. 3, 2002

(30) Foreign Application Priority Data

Jun. 28, 2000 (JP) .......................................... 2000-193721

(51) Int. Cl.$^7$ ................................................. B25J 15/08
(52) U.S. Cl. ........................ 294/1.1; 294/86.4; 294/902; 901/39
(58) Field of Search .................................. 294/1.1, 68.1, 294/68.27, 86.4, 119.1, 902; 901/39, 45

(56) References Cited

U.S. PATENT DOCUMENTS

| | | | | |
|---|---|---|---|---|
| 4,368,913 A | * | 1/1983 | Brockmann et al. ........ 294/106 |
| 4,371,100 A | * | 2/1983 | Muhlbauer et al. ......... 164/438 |
| 4,645,411 A | * | 2/1987 | Madwed ................... 198/468.2 |
| 4,822,091 A | * | 4/1989 | Vermeer et al. ............... 29/740 |
| 5,120,101 A | * | 6/1992 | Vranish ..................... 294/119.1 |
| 5,178,431 A | * | 1/1993 | Voellmer ..................... 269/270 |
| 5,466,025 A | * | 11/1995 | Mee ............................ 244/161 |

* cited by examiner

Primary Examiner—Dean J. Kramer
(74) Attorney, Agent, or Firm—Armstrong, Westerman & Hattori, LLP

(57) ABSTRACT

A positional displacement absorbing structure for absorbing the positional displacement of an article 21 clamped by a pair of robot arms 22, 22 is provided. The pair of the robot arms include recesses 32, 33 on their faces 31, 31 opposed to the article. The article 21 includes projections 25, 26 on its side faces 24, 24 opposed to the pair of the robot arms 22, 22. The projections 25, 26 are adapted to be respectively engaged in the recesses 32, 33. Each of the projections 25, 26 is formed with a pair of inclined faces 27, 27, 28, 28 with which circumferential edges 34, 35 of the recesses 32, 33 are adapted to slidably contact.

3 Claims, 6 Drawing Sheets

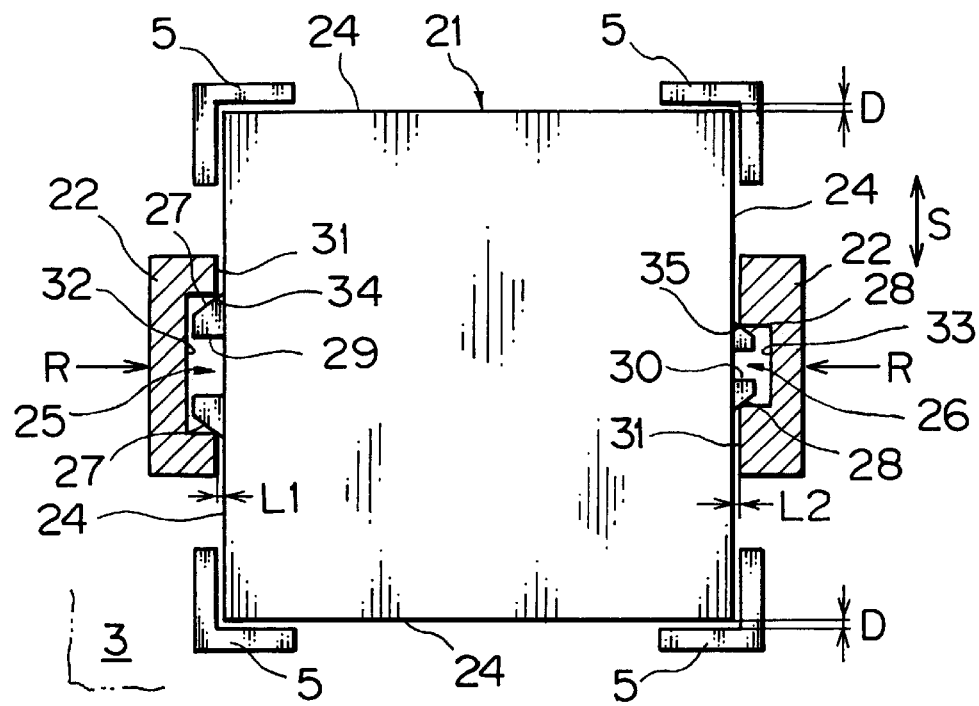
F I G. 1
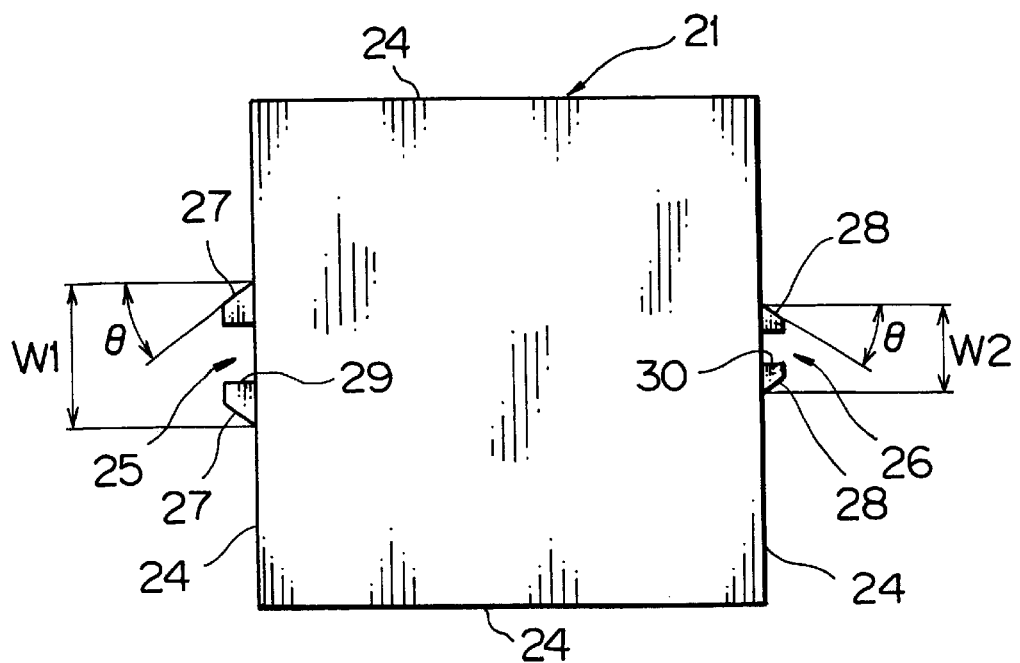
F I G. 2

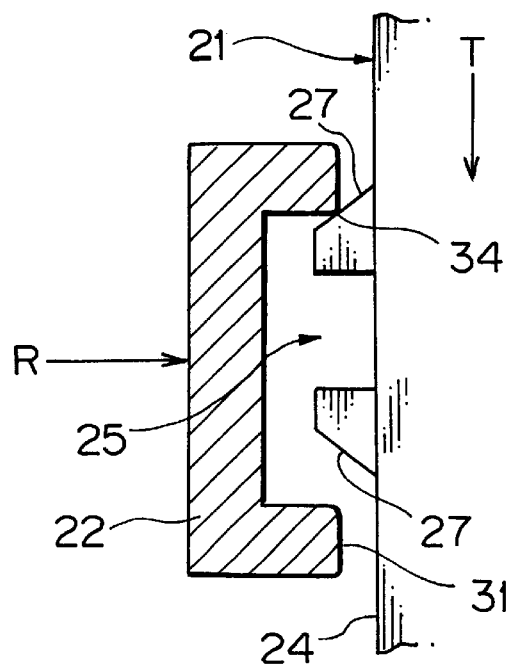
F I G. 4
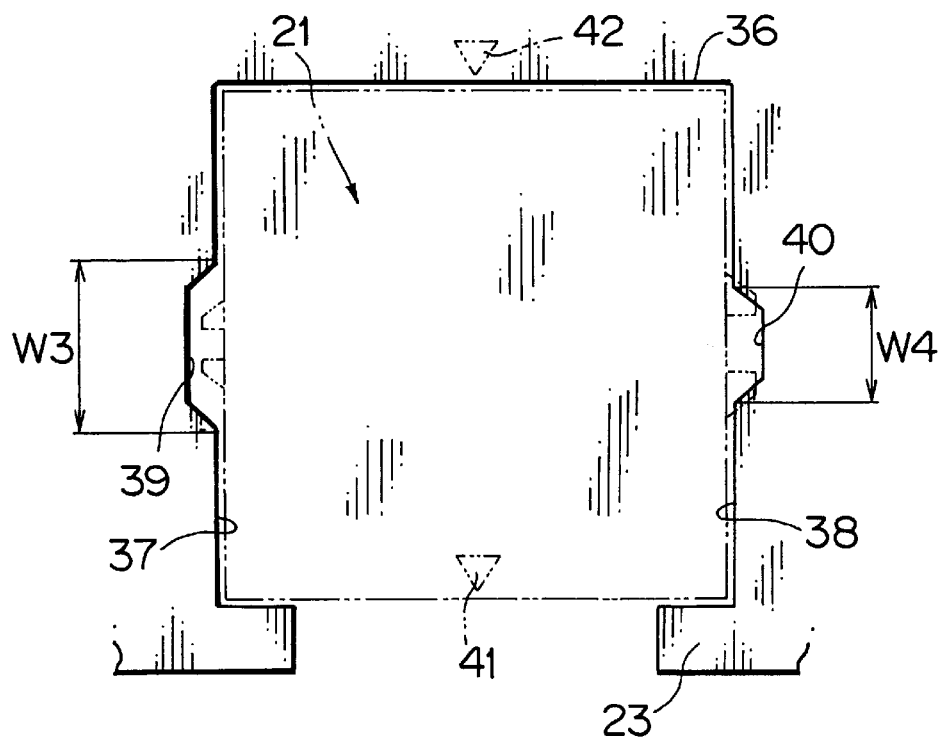
F I G. 5

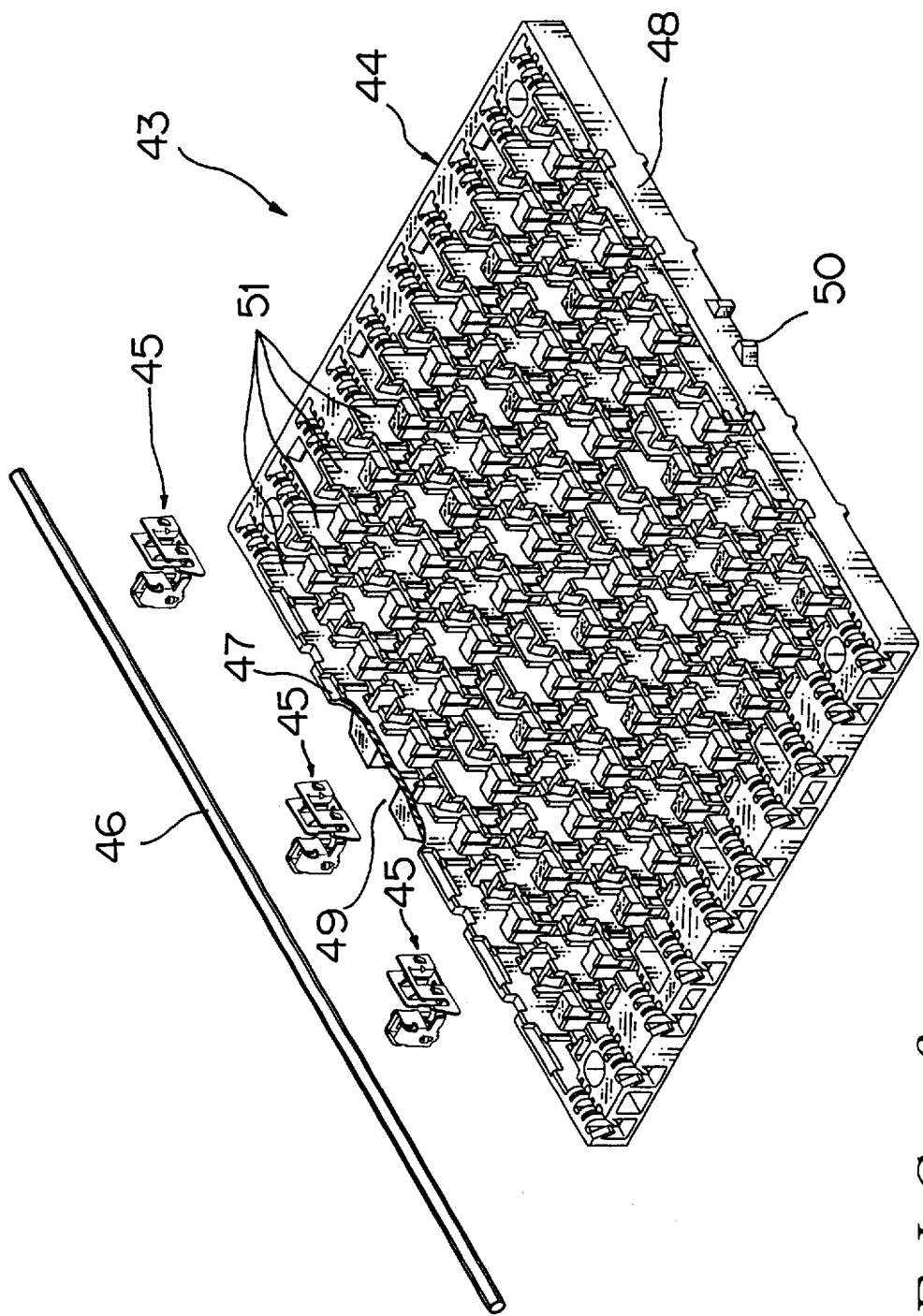
F I G. 6

STRUCTURE FOR ABSORBING POSITIONAL DISPLACEMENT OF AN ARTICLE CLAMPED BY ROBOT ARMS

BACKGROUND OF THE INVENTION

1. Field of the Invention

The present invention relates to a structure for absorbing positional displacement in a setting jig of an article which is clamped by robot arms.

2. Description of the Related Art

In factories in various industrial fields, there have been recently employed systems for assembling articles by means of robot arms.

In FIGS. 7 and 8, when assembling the electric connecting box to be mounted on an automobile in the automobile industry, for example, such a process that a plate connector 1 (an example of the articles) to be disposed therein being conveyed from a setting jig 3 by means of a robot 2 and fixed at a determined position, has been conducted.

The plate connector 1 is formed in a rectangular plate-like shape having four side faces 4, for example. The setting jig 3 has four holding frames 5, in an L shape as seen in a plan view, which are provided upright at four corners corresponding to four corners of the plate connector 1. In other words, the plate connector 1 is contained and held within the four holding frames 5 of the setting jig 3.

The robot 2 has a clamping part 6, and is so constructed that the robot can convey the plate connector 1 to the determined position, after it has moved downward in a direction of an arrow mark P and clamped the plate connector 1. The clamping part 6 has a pair of movable robot arms 7, 7 which are adapted to move close to each other in directions of an arrow mark Q thereby to clamp the plate connector 1. The robot arms 7, 7 are provided with flat contact faces 8, 8 which are adapted to be brought into contact with the side faces 4, 4 for clamping the plate connector 1.

In the above described conventional art, there has been formed a backlash having a size D between the plate connector 1 and each of the holding frames 5. This backlash has been required in consideration of setting and taking out of the plate connector 1 with respect to the setting jig 3. However, there has been a problem that in a case where strict positioning accuracy of the plate connector 1 is required in a next process after the plate connector 1 has been clamped and conveyed by the robot arms 7, 7, a positional displacement of the plate connector 1 cannot be absorbed, and management by the robot 2 would be difficult.

Meanwhile, the plate connector 1 is so constructed that it can be reliably fitted to a mating member 9 as shown in FIG. 9, provided that the plate connector 1 has been set in a normal direction with respect to the setting jig 3. If triangular marks 10, 11 are aligned, this means that the plate connector 1 has been set in the normal direction. However, there has been a fear of misassembly if the plate connector 1 has been set on the setting jig 3 in a wrong direction as shown in FIG. 10.

SUMMARY OF THE INVENTION

In order to solve the above described problems, according to one aspect of the present invention, there is provided a positional displacement absorbing structure for absorbing the positional displacement of an article clamped by a pair of robot arms, wherein the pair of robot arms respectively include recesses on their faces opposed to the article, the article includes projections on its faces opposed to the pair of robot-arms, the projections being adapted to be respectively engaged in the recesses, and each of the projections being formed with a pair of inclined faces with which peripheral edges of the recesses are adapted to slidably contact.

According to a second aspect of the invention, projections on opposite sides of the article are formed having different sizes.

According to a third aspect of the invention, the recesses of the robot arms on opposite sides of the article are also formed having different sizes in accordance with the sizes of the projections.

According to the first aspect of the present invention, when a pair of the robot arms have clamped the article, the positional displacement of the article can be absorbed. In other words, even though the positional displacement has occurred with respect to the article, the inclined faces of the projections of the article slidably contact clamping edges defined by the peripheral surfaces of the recesses of the robot arms when the article is clamped by the pair of the robot arms, and the article is moved to the normal position as the pair of the robot arms approach. The positional displacement can be thus absorbed.

According to the second aspect of the present invention, because the projections on alternate sides of the article are formed having different sizes, an article, which has been set in a wrong direction, will not be assembled to a mating member. Thus, misassembly can be avoided while the positional displacement is absorbed.

According to the second aspect of the present invention, because the recesses are also formed having different sizes in accordance with the sizes of the projections, the pair of the robot arms cannot reliably grasp the article in a case where the article has been set in the wrong direction. Accordingly, misassembly can be prevented before the article is conveyed to the mating member.

BRIEF DESCRIPTION OF THE DRAWINGS

FIG. 1 is a plan view partly in section of one embodiment of a positional displacement absorbing structure according to the present invention;

FIG. 2 is a plan view of an article of FIG. 1;

FIG. 4 is an enlarged view of an essential part for explaining absorption of the positional displacement of the article of FIG. 3;

FIG. 5 is a plan view of a mating member to which the article of FIGS. 1 and 3 is to be fitted;

FIG. 6 is an exploded perspective view of a plate connector which is one example of the article;

DESCRIPTION OF THE PREFERRED EMBODIMENTS

Figure 3:
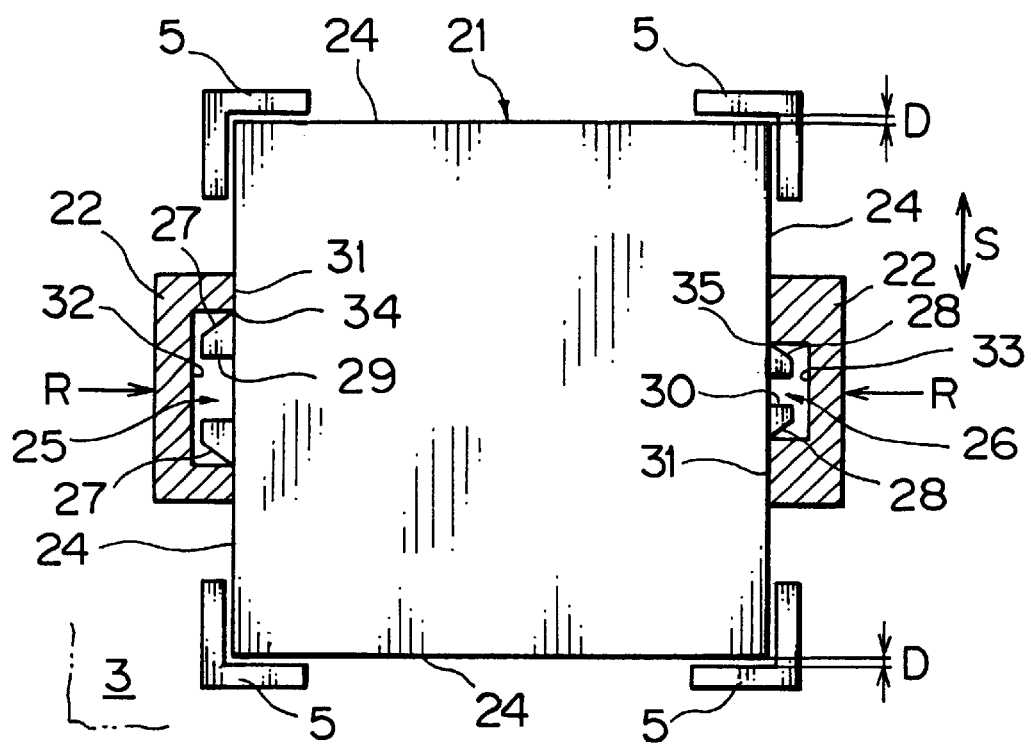
FIG. 3 is a plan view partly in section showing another embodiment of the positional displacement absorbing structure according to the present invention.

Now, an embodiment of the present invention will be described referring to the drawings.

Those members which are essentially the same as the members described in the conventional art will be denoted with the same reference numerals and their explanation will be omitted.

In FIG. 1, an article 21 is contained and retained within four holding frames 5 of a setting jig 3 with a backlash of a size D. The article 21 is so adapted that it can be clamped by a pair of robot arms 22, 22 (substitutes for the robot arms 7, 7 in FIG. 7 but having the same size) of a robot 2 (See FIG. 6), even though a displacement has occurred in the setting position, and the displacement can be corrected enabling the article 21 to be conveyed to a mating member 23 (See FIG. 5) and fitted thereto in a state of normal position.

The article 21 is formed in a rectangular shape having four flat side faces 24, as shown in FIGS. 1 and 2. The article 21 is further provided with projections 25, 26 which project in a same amount.

The projections 25, 26 have a pair of inclined faces 27, 27, and a pair of inclined faces 28, 28 and cut-outs 29, 30 respectively. The projections 25, 26 are formed on the side faces 24, 24 to be clamped by the robot arms 22, 22 with different sizes from each other. Further, the projections 25, 26 are arranged on an axis in a direction of arrow marks R in which direction the robot arms 22, 22 approach. A width W1 of the projection 25 (in a direction of an arrow mark S which is the direction of the positional displacement) is larger than a width W2 of the projection 26 in the same direction (W1>W2). Preferably, a difference in size of the projections 25 and 26 is such that the projection 25 may not enter in a below described recess 33 of the robot arm 22 corresponding to the projection 26.

The inclined faces 27, 27 are formed at an angle θ, for example of 45°, so that a distance between them may become narrow in a direction from a base end toward a distal end of the projection 25. In the same manner, the inclined faces 28, 28 are formed at an angle θ, for example of 45°, so that a distance between them may become narrow in a direction from a base end toward a distal end of the projection 26. The cut-out 29 of the projection 25 and the cut-out 30 of the projection 26 maybe formed having a same width in the direction of the arrow mark S. The cut-outs 29, 30 can be optionally formed. The projectioning amounts of the projections 25 and 26, and the angle θ are to be selected considering the above described backlash.

It is to be noted that the article 21 as shown in FIGS. 1 to 5 is diagramatically shown in order to clarify the gist of the present invention. The article 21 has slight clearances L1, L2 between the side faces 24, 24 and the robot arms 22, 22, and will be conveyed in this state, after it has been clamped by the robot arms 22, 22.

There are many examples of the articles 21 having various sizes. For example, electric products and casings therefor as large sized articles, and electronic or electric components as small sized articles can be raised as the examples. Further, connectors which are electrically or optically connected, housings therefor, electronic units such as engine control units and so on, in an automobile or wiring boards and plate connectors disposed in electric connecting boxes can be raised as the examples.

The robot arms 22, 22 are adapted to be brought near and away from each other in the direction of the arrow marks R and in opposite directions, and include clamping contact faces 31, 31 facing with the side faces 24, 24. The clamping contact faces 31, 31 for projections on alternate side faces 24 are respectively provided with recesses 32, 33 having different sizes so that the projections 25, 26 are adapted to be engaged in the recesses 32, 33. The recess 32 is formed in a C-shape in cross section having such a width (in the direction of the arrow mark S) and a depth that the projection 25 can enter up to a middle part in its projecting height in the direction S. The recess 33 is also formed in a C-shape in cross section having such a width (in the direction of the arrow mark 5) and a depth that the projection 26 can enter up to a middle part in its projecting height in the direction S. Preferably, the width of the recess 33 is narrower than the width W1 of the projection 25 from a viewpoint of preventing misassembly.

When the article 21 has been set with a displacement, the article 21 is abutted against circumferential edges 34, 35 of the recesses 32, 33. The edges 34, 35 slide along the inclined faces 27, 27 and 28, 28. Preferably, the edges 34, 35 may be tapered.

In a case where the article 21 is contained and retained inside the four frames 5 of the setting jig 3 in the normal direction without a positional displacement, the edges 34, 35 of the recesses 32, 33 are in contact with the inclined faces 27, 27 and 28, 28 while the article is clamped by the robot arms 22, 22. The projections 25, 26 enter in the recesses 32, 33, and at the same time, the clamping contact faces 31, 31 are positioned facing with the side faces 24, 24 with the slight clearances L1, L2 in a non-contact manner.

In a case where the article 21 is displaced within a range of the aforementioned backlash, one of the pair of edges 34, 34 (or 35, 35) slides along one of the pair of the inclined faces 27, 27 (or 28, 28), and the article 21 is centered with respect to the arms 22 to correct the misalignment. In this manner, the article 21 can be clamped at the normal position and in the normal direction. Thereafter, the article 21 is conveyed, and fitted to the mating member 23 as shown in FIG. 5.

In FIG. 5, the mating member 23 has a receiving part 36 formed with a rectangular shape, for example. A pair of opposed walls 37, 38 of the mating member 23 have recesses 39, 40, respectively. The recesses 39, 40 correspond to the projections 25, 26 of the article 21 (See FIG. 1) in such a manner that the projection 25 is adapted to be received in the recess 39, while the projection 26 is adapted to be received in the recess 40. The recess 39 has a width W3 which is somewhat larger than the width W1 of the projection 25, and the recess 40 has a width W4 which is somewhat larger than the width W2 of the projection 26 and smaller than the width W1 of the projection 25.

The article 21 which has been conveyed in a wrong direction will not be fitted to the mating member 23 which is constructed having such a dimensional relation. In a case where the article 21 is fitted in such a manner that the triangular marks 41, 42 are separated, fitting will not be possible because the projection 25 interferes with the recess 40. Thus, misassembly can be avoided.

FIGS. 3 and 4 show another embodiment of the positional displacement absorbing structure according to the present invention. For convenience of explanation, the same reference numerals as in the embodiment of FIG. 1 will be employed.

This embodiment is different from the embodiment in FIG. 1 in that the side faces 24, 24 of the article 21 are directly grasped by the robot arms 22, 22. By directly grasping the side faces 24, 24 of the article 21 by the faces 31, 31 of the robot arms 22, 22, a strong clamping force is exerted, enabling heavy articles to be reliably conveyed.

Figure 7:
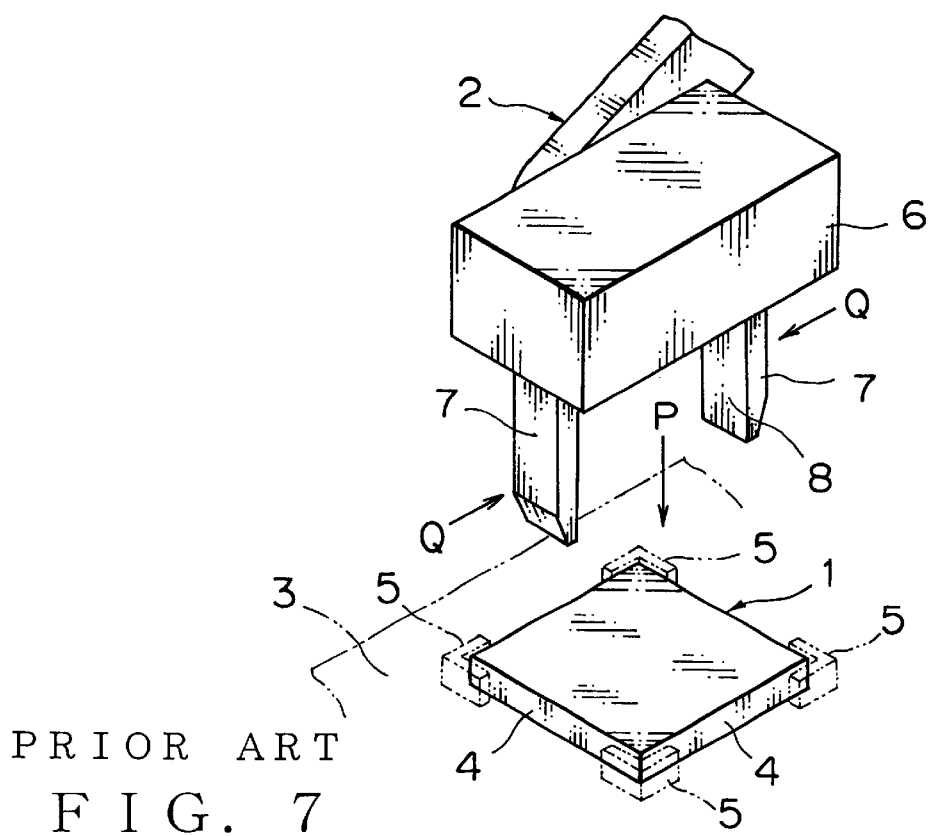
FIG. 7 is a perspective view of an article (a plate connector as one example) and a robot in a conventional case.
Figure 8:
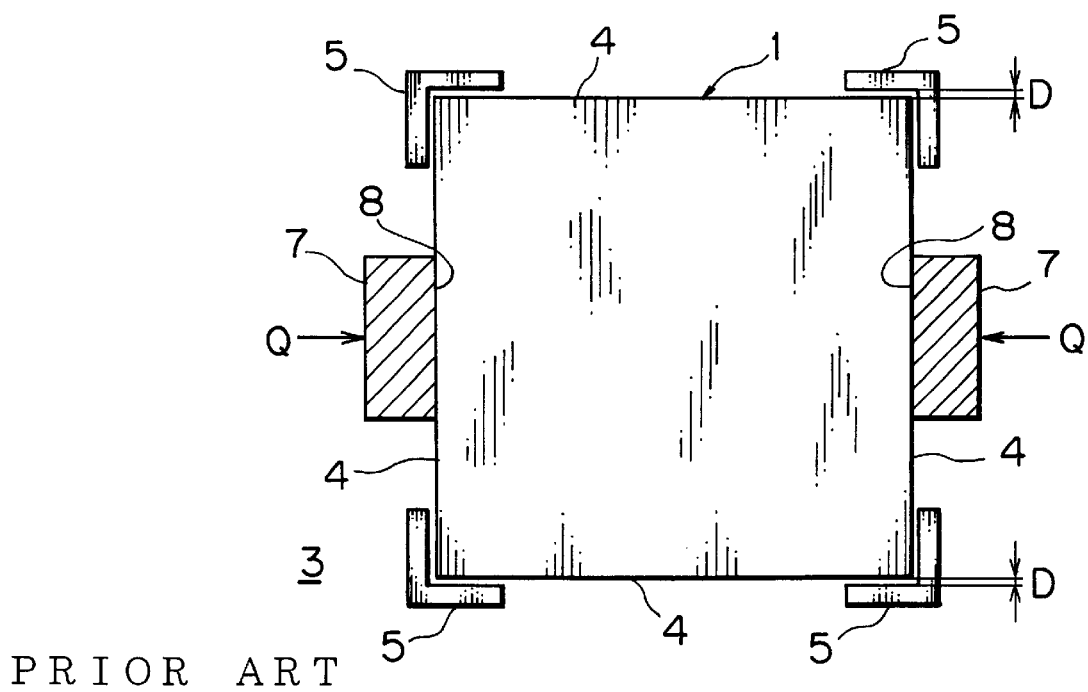
FIG. 8 is a plan view partly in section corresponding to FIG. 7.
Figure 9:
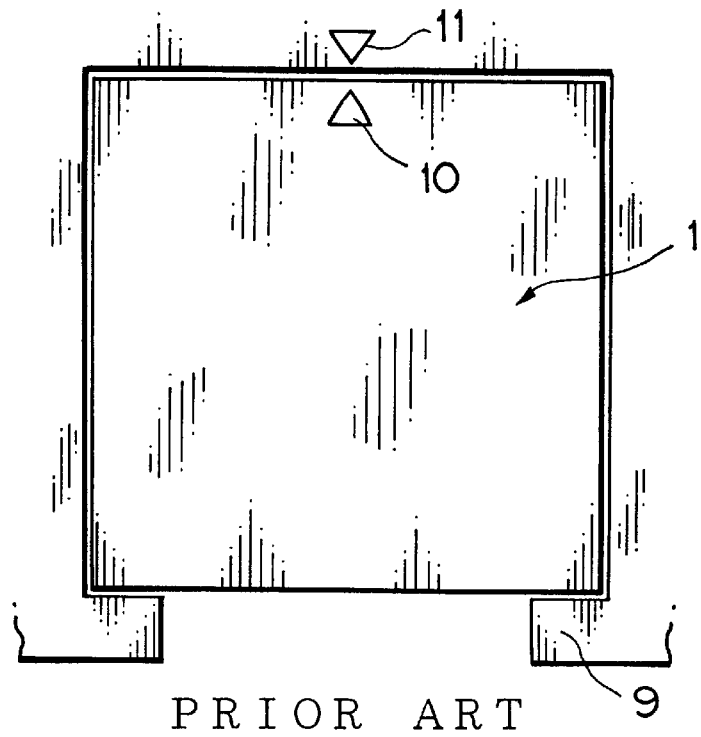
FIG. 9 is an explanatory view showing a state wherein the article of FIG. 7 has been normally fitted to a mating member.
Figure 10:
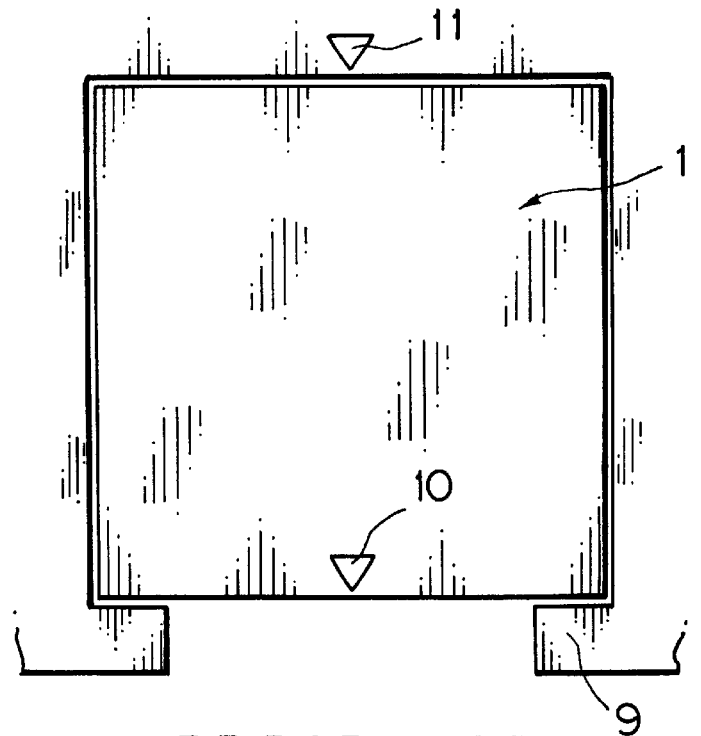
FIG. 10 is an explanatory view showing a state wherein the article of FIG. 7 has been fitted to the mating member in a wrong direction.

In FIG. 3, even though the article 21 which is contained in the four holding frames 5 of the setting jig 3 with clearances of a size D has been set at a position displaced from the normal position, the displacement will be corrected at the instant that it is clamped by the pair of the robot arms 22, 22 (substitutes for the robot arms 7, 7 in FIG. 7, but having the same size). Then, the article 21 can be conveyed to the mating member 23 (See FIG. 5) in a state of the normal position to be fitted thereto.

The article 21 is formed in a rectangular shape having four flat side faces 24, as shown in FIGS. 2 and 3. The article 21 is further provided with projections 25, 26 which project in the same amount.

The projections 25, 26 have a pair of inclined faces 27, 27, a pair of inclined faces 28, 28 and cut-outs 29, 30 respectively. The projections 25, 26 are formed on the side faces 24, 24 to be clamped by the robot arms 22, 22 with different sizes from each other. Further, the projections 25, 26 are arranged on an axis in a direction of arrow marks R in which direction the robot arms 22, 22 approach. A width W1 of the projection 25 (in a direction of an arrow mark S which is the direction of the positional displacement) is larger than a width W2 of the projection 26 in the same direction (W1>W2). Preferably, the difference in size of the projections 25 and 26 is such that the projection 25 will not enter in a below-described recess 33 of the robot arm 22 corresponding to the projection 26.

The inclined faces 27, 27 are formed at an angle θ, for example of 45°, so that the distance between them will become narrow in a direction from a base end toward a distal end of the projection 25. In the same manner, the inclined faces 28, 28 are formed at an angle θ, for example of 45°, so that the distance between them will become narrow in a direction from a base end toward a distal end of the projection 26. The cut-out 29 of the projection 25 and the cut-out 30 of the projection 26 may be formed having the same width in the direction of the arrow mark S. The cut-outs 29, 30 can be optionally formed. The projecting amounts of the projections 25 and 26, and the angle θ are to be selected considering the above described backlash.

It is to be noted that the article 21, as shown in FIGS. 1 to 5, is diagrammatically shown in order to clarify the gist of the present invention. The article 21 has slight clearances L1, L2 between the side faces 24, 24 and the robot arms 22, 22, and will be conveyed in such a state after it has been clamped by the robot arms 22, 22.

The robot arms 22, 22 are adapted to be brought near and away from each other in the direction of the arrow mark R and in opposite directions, and include clamping contact faces 31, 31 facing with the side faces 24, 24. The clamping contact faces 31, 31 on oppositely positioned robot arms 22, 22 are respectively provided with recesses 32, 33 having different sizes so that the projections 25, 26 are adapted to be engaged in the respective recesses 32, 33. The recess 32 is formed in a C-shape in cross section having such a width (in the direction the arrow mark S) and a depth that the projection 25 can enter up to a middle part in its projecting height. The recess 33 is also formed in a C-shape in cross section having such a width (in the direction the arrow mark S) and a depth that the projection 26 can enter up to a middle part in its projecting height. Preferably, the width of the recess 33 is narrower than the width W1 of the projection 25 from a viewpoint of preventing misassembly.

When the article 21 has been set with a displacement, the article 21 is abutted against edges 34, 35 of the recesses 32, 33. The edges 34, 35 slide along the inclined faces 27, 27 and 28, 28. Preferably, the edges 34, 35 may be tapered.

In a case where the article 21 is contained and retained inside the four frames 5 of the setting jig 3 in the normal direction without a positional displacement, the edges 34, 35 of the recesses 32, 33 will not contact with the inclined faces 27, 27 and 28, 28 while the article is clamped by the robot arms 22, 22. The projections 25, 26 enter in the recesses 32, 33, and at the same time, the clamping contact faces 31, 31 come in contact with the side faces 24, 24. In contrast, in a case where the article 21 is displaced within a range of the aforementioned backlash as shown in FIG. 4, the circumferential edges 34, 35 of the recesses 32, 33 come in contact with one of the inclined faces 27, 27 or 28, 28, to push the same in a direction of the arrow mark R (only the recess 32 is shown in FIG. 3). Then, since the article 21 has the aforesaid backlash, one of the inclined faces 27, 27 or 28, 28 slidably moves along the circumferential edges 34, 35 of the recesses 32, 33 (in a direction of an arrow mark T in FIG. 4) by the force applied by the robot arms 22, 22. Thus, the positional displacement will be absorbed, and the article 21 is clamped at the normal position and in the normal direction. Thereafter, the article 21 is conveyed, and fitted to the mating member 23 as shown in FIG. 5.

In FIG. 5, the mating member 23 has a receiving part 36 formed with a rectangular shape, for example. A pair of opposed walls 37,38 of the mating member 23 have recesses 39,40, respectively. The recesses 39, 40 correspond to the projections 25, 26 of the article 21 (See FIG. 3) in such a manner that the projection 25 is adapted to be received in the recess 39, while the projection 26 is adapted to be received in the recess 40. The recess 39 has a width W3 which is somewhat larger than the width W1 of the projection 25, and the recess 40 has a width W4 which is rather larger than the width W2 of the projection 26 and smaller than the width W1 of the projection 25.

The article 21, which has been conveyed in a wrong direction will not be fitted to the mating member 23 which is constructed having such a dimensional arrangement. In a case where the article 21 is fitted in such a manner that the triangular marks 41, 42 are separated, the fitting will not be possible because the projection 25 interferes with the recess 40. Thus, misassembly can be avoided.

It is apparent that various modifications can be made within a scope not deviating from the gist of the present invention.

Referring to FIG. 6, an example of the article will be briefly described. The article which is shown in FIG. 6 is a plate connector 43 consisting of a stacking plate 44, crimp terminals 45, and an electric wire 46.

The stacking plate 44 has such a structure that the stacking plate 44 itself constitutes the article. On side faces 47, 48 of the stacking plate 44 which is formed in a shape of a rectangular plate, there are formed projections 49, 50 which are adapted to enter in the recesses 32, 33 (See FIGS. 1, 3) of the robot arms 22, 22. The projections 49, 50 have the same shape as the projections 25, 26 having a pair of inclined faces (See FIG. 2). The crimp terminals 45 are adapted to be mounted on at least one desired position of a plurality of terminal containing parts 51 formed on the stacking plate 44. The electric wire 46 is adapted to be crimped to the crimp terminals 45.

With the structure as described above, the plate connector 43 will be clamped by the robot arms 22, 22 to be conveyed.

If a positional displacement should occur, the positional displacement will be absorbed by means of the recesses 32, 33 (See FIGS. 1, 3) and the projections 49, 50.

Although the present invention has been fully described by way of examples with reference to the accompanying drawings, it is to be noted that various changes and modifications can be made within the scope of the present invention.

What is claimed is:

1. A positional displacement absorbing structure for absorbing positional displacement of an article clamped by a pair of opposed, movable robot arms, wherein each robot arm of said pair including a clamping body containing a recess in a face opposed to said article, surfaces of said recess cooperating with surfaces of said clamping body face to define mutually spaced, opposed article-contacting edges, said article including projections on its faces opposed to said pair of opposed robot arms, said projections being operative to be respectively received in said recesses of said clamping bodies for engagement by said contacting edges when said robot arms are moved toward said article, and each of said projections being formed with a pair of oppositely directed inclined faces with which the contacting edges of an associated recess are operative to slidably contact in edge-to-surface engagement.

2. A positional displacement absorbing structure for absorbing positional displacement of an article clamped by a pair of opposed, movable robot arms, wherein each robot arm of said pair including a clamping body containing a recess in a face opposed to said article, surfaces of said recess cooperating with surfaces of said clamping body face to define mutually spaced, opposed article-contacting edges, said article including projections on its faces opposed to said pair of opposed robot arms, said projections being operative to be respectively received in said recesses of said clamping bodies for engagement by said contacting edges when said robot arms are moved toward said article, each of said projections being formed with a pair of oppositely directed inclined faces with which the contacting edges of an associated recess are operative to slidably contact in edge-to-surface engagement; and wherein projections on opposite sides of said article are formed to provide convergent faces disposed on different spacing.

3. The positional displacement absorbing structure as claimed in claim 2, wherein recesses in the respective clamping bodies are also formed having contact edges disposed on different spacing in accordance with the spacing of said convergent faces of said projections.

* * * * *